United States Patent Office 3,313,831
Patented Apr. 11, 1967

3,313,831
PREPARATION OF COENZYME Q₁₀(H–10) FROM GIBBERELLA
Paul H. Gale, Clark, N.J., assignor to Merck & Co., Inc., Rahway, N.J., a corporation of New Jersey
No Drawing. Original application Mar. 15, 1963, Ser. No. 265,344. Divided and this application June 29, 1965, Ser. No. 478,006
3 Claims. (Cl. 260—396)

This application is a division of application Ser. No. 265,344, filed Mar. 15, 1963.

This invention relates to new compounds of the class of compounds known as "coenzyme Q," derivatives thereof, and to methods for the preparation of these compounds. More particularly, it is concerned with 2,3-dimethoxy - 5-methyl - 6-[3'-methylbutanyl-nonakis - (3'-methyl - 2'-butenylene)]-benzoquinone, its 6-chromenol and 6-chromanol derivatives and processes for their preparation. The members of the coenzyme Q group of compounds are 2,3-dimethoxy-5-methyl benzoquinones having isoprenoid side chains at the 6 position. Thus, coenzyme $Q_{10}$ contains 10 isoprenoid units on the side chain at the 6 position. The complexity of the isoprenoid side chain makes it impractical to prepare these products by organic synthesis for commercial production. In view of this structural complexity, production by fermentation of suitable microrganisms is presently the method of choice.

It is an object of this invention to provide a new member of the coenzyme Q group of compounds. Another object is to provide a process for preparing this new compound. A further object is to provide new chromanol or chromenol derivatives of this product. Other objects will be apparent from the detailed description of this invention hereinafter provided.

This invention is concerned with a new member of the coenzyme Q group of compounds herein also sometimes called coenzyme $Q_{10}$(H–10) having the structural formula:

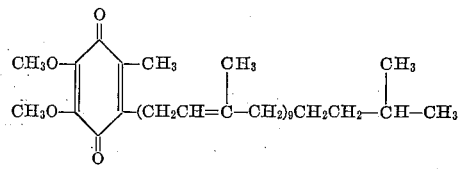

I and the corresponding 6-chromenol and 6-chromanol derivatives thereof, and processes of preparing these compounds.

Since the terminal isoprenoid unit of the side chain in this new compound is reduced, the product is designated as coenzyme $Q_{10}$(H–10). There has been no nomenclature to designate such a compound and the name given to it indicates that the compound contains 10 isoprenoid units; the letter H designating hydrogen or reduction (as frequently used in organic nomenclature) and the number following the H, namely, 10, indicating that the 10th isoprenoid unit counting from the nucleus is reduced.

In accordance with one embodiment of this invention, it is now found that coenzyme $Q_{10}$(H–10) is obtained by saponifying cells of Gibberella and thereafter recovering it from the resulting saponifying product. Thus, by growing suitable coenzyme $Q_{10}$(H–10) producing strains of Gibberella in fermentation mediums containing assimilable sources of carbon, nitrogen and essential inorganic salts and subjecting the resulting fermentation broth to saponification with an alkali such as sodium hydroxide, the resulting saponified product is found to contain the new compound which can be recovered by extraction procedures hereinafter described. The cells of various strains of Gibberella can be used in producing this new product, but it is preferred to use cells obtained by growing the gibberellic acid-producing strains, namely, *Gibberella fujckuroi*, which is used for the commercial production of gibberellic acid.

Pursuant to a specific embodiment of this invention, the new product of this invention can be recovered from the Gibberella cells by first saponifying cells by heating with an alkali such as sodium hydroxide, extracting the resulting saponifying cells with a suitable water soluble solvent for the product such as hexane, evaporating the resulting solvent extract and chromatographing a solution of the resulting residue over a column of magnesium silicate. The resulting magnesium silicate column can be eluted with a 50% solution of ether in hexane. Further purification of the product is achieved by chromatography over magnesium alumino silicate; the product being eluted by washing with a solution of 20% ether in hexane.

In accordance with another embodiment of this invention, the corresponding chromanol compound 2-methyl-2-[3'-methylbutanyl - oktakis - (3'-methyl - 2'-butenylene)]-7,8-dimethoxy - 6-benzochromanol is conveniently prepared by first reducing the corresponding quinone 2,3-dimethoxy - 5 - methyl-6-[3'-methylbutanylnonakis - (3'-methyl - 2'-butenylene)]-benzoquinone by treatment with sodium hydrosulfite or any of the other common reducing agents to form the corresponding hydroquinone. The hydroquinone thus formed is heated in the presence of a suitable acid catalyst, such as p-toluene sulfonic acid, phosphorus pentoxide, potassium acid sulfate, sulfuric acid, hydrogen chloride, formic acid, and the like. Generally, in carrying out this step of the process, it is desirably effected in the presence of a suitable solvent for the hydroquinone, such as glacial acetic acid, dioxane, acetic anhydride, and the like, at a temperature of about 50° C. or above. For example, the hydroquinone may be refluxed in acetic acid solution with potassium hydrogen sulfate at from about ½ to 2 hours to form the corresponding chromanol 2-methyl-2-[3'-methylbutanyl-oktakis-(3'-methyl-2'-butenylene)]-7,8-dimethoxy - 6-chromanol. The chromanol thus obtained is isolated from the reaction mixture by procedures known in the art, such as chromatography and crystallization.

Pursuant to a further embodiment of this invention, the benzoquinone compound 2,3-dimethoxy-5-methyl-6-[3'-methylbutanyl-nonakis - (3'-methyl - 2'-butylene)]-benzoquinone is intimately contacted with sodium hydride to produce the chromenol 2-methyl - 2-[3'-methylbutanyl-oktakis - (3'-methyl - 2'-butenylene)] - 7,8-dimethoxy-benzo-3-chromen-6-ol, and then recovering the chromenol compound from the resulting reaction mixture. The reaction is most conveniently effected by heating the quinone with the sodium hydride in the presence of a suitable inert solvent, for example, a hydrocarbon solvent such as benzene, toluene, xylene, and the like. Generally, it is preferred to carry out the reaction in benzene while heating the reaction mixture at the reflux temperature to complete the formation of the chromenol compound.

In carrying out the reaction to obtain maximum yields of the desired chromenol compound under optimum conditions, it is preferred to use an amount of sodium hydride which is not less than about one-half, by weight, of the quinone compound being reacted. Although larger amounts of sodium hydride can be used, it is generally found that lower yields of the desired products are obtained.

The chromenol compound is recovered from the reaction mixture by acidifying the mixture with acetic acid, separating the solvent layer and concentrating it to obtain the crude product. The product so obtained can be further purified by chromatography over adsorbents, such as silica gel or a magnesium silicate. The chromenol is recovered from the adsorbent by elution with a suitable solvent, such as 3% ether in iso-octane.

The close structural relationship between the new quinone (I) from *Gibberella fujckuroi* and coenzymes $Q_9$ and $Q_{10}$ was first noted as a result of the marked similarity between their ultraviolet spectra. The spectra of $Q_{10}$ and I, before and after treatment with sodium borohydride, were qualitatively and quantitatively identical. In addition, both compounds gave indistinguishable elemental analytical data.

The difference in the melting points (28–29° C. vs. 49.5–50.5° C.) of this quinone and coenzyme $Q_{10}$ showed that the two compounds are not identical. Moreover, their papergram mobilities were quite different, the new quinone being less mobile than coenzyme $Q_{10}$.

Identity of the quinonoid nuclei of I and $Q_{10}$ was determined by comparison of their NMR spectra. The absence of any aromatic protons established that the nucleus was totally substituted. Further interpretations of these data and NMR spectral data of solanesol, plastoquinone, and 2,3-dimethoxy - 5-methyl - 6-phytylbenzoquinone led to determination of the structure of the isoprenoid side chain.

The area measurements of the resonance at 4.95 tau revealed the presence of only nine side chain —CH= protons instead of ten as found in coenzyme $Q_{10}$. In addition to having all of the proton types of coenzyme $Q_{10}$, the new quinone showed, like 2,3-dimethoxy-5-methyl-6-phytylbenzoquinone, protons in the paraffinic region of 8.8–9.3 tau, indicating the presence of at least one reduced isoprenoid unit. The typical doublet at 9.10 and 9.20 tau of 6-proton area clearly corresponds to the presence of nine —CH= protons and no more than five protons in the 8.75 tau region, which is clearly a complex group of spin-spin coupled resonances corresponding to a terminal

function. The doublet separation of 0.1 tau unit was similar to the known spin-spin coupling constant of an isopropyl group. In further support of this conclusion, it may be stated that the reduction of one carbon-carbon double bond located in mid-chain would produce seven paraffinic protons, which would fall in the 8.75 tau region, and since two paraffinic methyls are certainly present, it follows that two mid-chain isoprenoid units would have to be in the reduced state yielding 14 paraffinic protons whose resonances would be found in the 8.75 tau region. This is far in excess of the small number observed. This type of effect was found in the case of the 6-phytylbenzoquinone model where the 8.78 tau band was much larger in area than the paraffinic methyl doublet resonances at 9.08 and 9.19 tau. This is in accord with a phytyl side chain which has three reduced isoprenoid units.

Any consideration based on the absence of a 5-methyl group and of the presence, in its place, of an isopropyl group, as in II, is excluded by the presence of the multiplet at 8.75 tau; this multiplet would not be present for the substitution of II. Indeed,

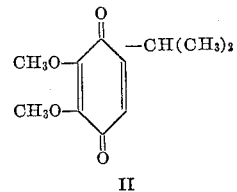

II a slight but definite shoulder was perceivable on the low field side of the band at 8.01 tau which is compatible with the presence of a 5-methyl group. This effect is more clearly seen in the NMR spectrum of coenzyme $Q_{10}$. The presence of only two protons of the =C—$CH_2$C= type at 6.80 and 6.94 tau clearly show the presence of only one isoprenoid side chain on the benzoquinone nucleus.

The structure of the isoprenoid side chain, established by these data, is therefore the same as that for coenzyme $Q_{10}$, except that the terminal unit is isopentanyl instead of isopentenyl.

The length of the side chain was confirmed by comparison of the papergram mobilities of catalytically reduced coenzyme $Q_9$, coenzyme $Q_{10}$, and this new quinone. The side-chain reduction products, as quinones, from the latter two compounds had the same mobility. The reduced product from coenzyme $Q_9$ moved at a faster rate.

The following example is presented to illustrate the method of carrying out the process of the present invention.

*Example 1*

Six liters of fermentation broth produced by growing *Gibberella fujckuroi* in a suitable nutrient medium was centrifuged, and the cellular paste was dried to a moist cake on a Büchner funnel. To the 800 g. of moist cells was added 75 grams of pyrogallol, 300 grams of sodium hydroxide, 1.5 liters of methanol and 1 liter of water. The mixture, contained in a 3-liter round bottom flask, was heated under reflux for one hour. After being cooled for one-half hour, the mixture was extracted successively with three 1.5 liter volumes of hexane. The pooled extracts were washed with three 500-ml. portions of water, and then dried over anhydrous sodium sulfate. Evaporation of the solvent from the dried hexane solution gave an oily, orange-colored residue which weighed 550 mg.

A column of activated magnesium silicate was prepared by pouring a mixture of 7.5 grams of the adsorbent, 60–100 mesh, in hexane in a 9 mm. I.D. glass chromatograph column. The excess solvent was drained from the column until only a thin layer remained above the silicate. A solution containing 550 mg. of the oily residue in 10 ml. of hexane was added to the column and allowed to slowly flow through it. The solution was followed successively by 125 ml. of hexane, 100 ml. of 5% ethylether in hexane, and finally 100 ml. 50% ether in hexane. The third 100-ml. eluate was concentrated in vacuo to a yellow oil. A solution of the oil in 10 ml. of isooctane deposited white crystals at 5° C. A second drop of crystals was obtained from the concentrated mother liquor. Evaporation of the final liquors gave an orange oil which was combined with similar material from another batch of cells. The pooled sample weighed 310 mg.

The 310 mg. of material in 5 ml. of hexane was added to a 9-mm. diameter column of magnesium alumino silicate, 50 mesh and finer, prepared in the same manner as the magnesium silicate column. The column was washed with 125 ml. of hexane, and then eluted with 230 ml. of 2% ether in hexane; the data are in Table I.

TABLE I.—MAGNESIUM ALUMINO SILICATE CHROMATOGRAPHY

| Developing Solvent | Volume of Fractions (ml.) | |
|---|---|---|
| 125 ml. of hexane; 230 ml. of 2% ether in hexane. | 1 | 125 |
| | 2 | 100 |
| | 3 | 10 |
| | 4 | 11 |
| | 5 | 13 |
| | 6 | 12 |
| | 7 | 13 |
| | 8 | 12 |
| | 9 | 60 |

Fractions 3–9 were evaporated to dryness. A solution of each residue in 1 ml. of absolute ethanol was cooled to 5° C. Solutions from fractions 5–8 deposited orange crystals which were combined and dried in vacuo, weight 32 mg., M.P. 28–29° C.

*Analysis.*—Calcd. for $C_{59}H_{92}O_4$: C, 81.88; H, 10.72. Found: C, 81.46; H, 10.50.

An ethanol solution of the product gave an ultraviolet spectrum, $$\lambda_{max}. 275\ m\mu,\ E_{1\ cm.}^{1\%}\ 165$$

Treatment of the solution with sodium borohydride produced a shift in the ultraviolet maximum to $$290\ m\mu,\ E_{1\ cm.}^{1\%}\ 30$$

Coenzyme $Q_{10}$ and the new quinone were paper-chromatographed, using petroleum jelly (Vaseline) impregnated circles of Whatman No. 1 paper, with 97.3 dimethylformamide:water solution saturated with petroleum jelly as mobile phase. The chromatograms were developed radially. Zones on the air-dried papergrams were visible as dark areas when viewed in ultraviolet light. The two compounds gave zones with $R_f$'s 0.33 and 0.26, respectively. Comparisons of the mobilities of the monoethoxy and diethoxy analogs of $Q_{10}$ and of this new quinone gave a value of 0.22 for the new quinone alone and slightly elongated zones at the same $R_f$ for mixtures of the compound with the ethoxy analogs. Paper chromatography of the same compound, using 99:1 dimethylformamide:water as developing solvent gave slightly elongated zones with $R_f$'s 0.43 and 0.45, respectively, for mixtures of the new compound and the mono and diethoxy coenzyme $Q_{10}$ analogs.

Approximately 20-mg. samples of the compound from *Gibberella fujckuroi* and of coenzymes $Q_9$ and $Q_{10}$ were each dissolved in 20 ml. of ethyl acetate and reduced catalytically using a platinum oxide catalyst. The products were isolated as oils and then chromatographed radially on petroleum jelly-treated Whatman No. 1 paper. Glacial acetic acid-saturated with petroleum jelly was the mobile phase. Reduced coenzymes $Q_9$, $Q_{10}$ and the new compound gave ultraviolet absorbing zones having $R_f$'s 0.07, 0.03 and 0.03, respectively. A mixture of the latter two compounds moved as a single substance. After chromatography (descending) for 68 hours, using the same system, the quinones of perhydrogenated coenzyme $Q_{10}$ and the new compound had moved 9.6 cm.; the corresponding compound from coenzyme $Q_9$ had moved 22.8 cm.

*Example 2*

A 20 mg. sample of the parent quinone, 2,3-dimethoxy-5 - methyl - 6 - [3' - methylbutanyl-nonakis-(3'-methyl-2'-butenylene)]-benzoquinone is reduced to the hydroquinone in ethereal solution of 10 ml. volume by shaking vigorously with approximately an equal volume of freshly-prepared saturated sodium hydrosulfite solution. The ethereal layer containing the hydroquinone product is washed (under a nitrogen atmosphere) with saturated sodium chloride solution, dried over anhydrous sodium sulfate, filtered and concentrated to a residue. The residue containing the partially purified hydroquinone is immediately cyclized by dissolving the hydroquinone in 5 ml. of glacial acetic acid, adding 20 mg. of potassium hydrogen sulfate, and refluxing the mixture for one hour under nitrogen, whereby the product 2-methyl-2-[3'-methylbutanyl - oktakis - (3' - methyl - 2'-butenylene)]-7,8-dimethoxy-6-chromanol is formed.

The acetic acid solution of the product is then evaporated under reduced pressure to remove the acetic acid, leaving the crude chromanol as a residue. The crude chromanol is purified by dissolving in 15 ml. of ether. The ethereal solution is washed with water repeatedly until free of acid, and dried over anhydrous sodium sulfate. The ether solution is concentrated to an oily residue of 17 mg. of substantially pure chromanol. Traces of uncyclized quinone and hydroquinone are separated by column chromatography of the residue on silica gel. The column is eluted with mixtures of 2–5% ether in iso-octane. The fractions showing ultraviolet absorption maxima at 292 m$\mu$ are combined; the $$E_{1\ cm.}^{1\%}$$

of the purified isolate is 41, with $\lambda$ max. at 292 m$\mu$ in iso-octane; the infrared spectrum shows no carbonyl at the 6$\mu$ region, but bands at 2.85 (hydroxyl) and 9$\mu$ are present.

*Example 3*

A 50 mg. sample of 2,3-dimethoxy-5-methyl-6-[3'-methylbutanyl - nonakis - (3' - methyl - 2'-butenylene)]-benzoquinone is added to a 50 ml. round-bottom 3-necked flask fitted with stirrer, nitrogen inlet, and reflux condenser, and containing approximately 20 ml. of dry benzene. Approximately one-half the solvent is removed by distillation to thoroughly dry the apparatus and materials. A droplet of sodium hydride (dispersion in oil, made equivalent to approximately 30 mg. by comparison of standardized amounts) is added and the whole mixture is stirred and refluxed for two hours in a nitrogen atmosphere. Then the mixture is cooled, and with continued stirring, 2 ml. of cold 1 N acetic acid is slowly added. Water (20 ml.) and ether (5 ml.) are added; the organic layer is separated, washed three times more with water, dried over anhydrous magnesium sulfate, filtered and concentrated to an oily residue. This residue is chromatographed over a column of 4 g. of silica gel. A solution of 3% ether in iso-octane elutes fractions having high absorbance at 282 m$\mu$ in the ultraviolet.

Combination of fractions having a ratio of approximately 2.4 to 2.9 of absorbances at the 275–284 m$\mu$ region gives substantially pure 2-methyl-2-[3'-methylbutanyl-oktakis - (3' - methyl - 2' - butenylene)] - 7,8 - dimethoxy-benzo-3-chromen-6-ol, having ultraviolet absorption maxima at 232, 275, 282 and 330 m$\mu$.

The new compounds of the present invention are useful antioxidants which can be used to inhibit the oxidation of various animal and vegetable fats and oils. These compounds can be used either by themselves or in combination with other antioxidant materials which are known in the art as antioxidants.

Various changes and modifications of the invention can be made, and to the extent that such variations incorporate the spirit of this invention, they are intended to be included within the scope of the appended claims.

What is claimed is:

1. The process for producing coenzyme $Q_{10}$(H–10) which comprises saponifying cells of a coenzyme $Q_{10}$(H–10) producing strain of Gibberella, and recovering said coenzyme $Q_{10}$(H–10) from the resulting saponified product.

2. The process of claim 1 wherein the coenzyme $Q_{10}$(H–10) producing strain is *Gibberella fujckuroi*.

3. The process of claim 1 wherein the saponification of the cells is carried out by heating the cells with aqueous sodium hydroxide.

References Cited by the Examiner

Page et al.: Chemical Abstracts, 1960, vol. 54, page 25021 f, g.

LORRAINE A. WEINBERGER, *Primary Examiner.*

L. A. THAXTON, *Assistant Examiner.*